United States Patent
Ito (10) Patent No.: US 11,540,299 B2
(45) Date of Patent: Dec. 27, 2022

(54) WIRELESS COMMUNICATION SYSTEM, WIRELESS COMMUNICATION DEVICE, AND NON-TRANSITORY STORAGE MEDIUM

(71) Applicant: KABUSHIKI KAISHA TOSHIBA, Tokyo (JP)

(72) Inventor: Toshio Ito, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 127 days.

(21) Appl. No.: 17/249,334

(22) Filed: Feb. 26, 2021

(65) Prior Publication Data
US 2022/0007380 A1    Jan. 6, 2022

(30) Foreign Application Priority Data

Jul. 6, 2020   (JP) .............................. JP2020-116581

(51) Int. Cl.
*H04W 72/12*   (2009.01)
*H04W 56/00*   (2009.01)

(52) U.S. Cl.
CPC ..... *H04W 72/1205* (2013.01); *H04W 56/001* (2013.01)

(58) Field of Classification Search
CPC .......... H04W 72/1205; H04W 56/001; H04W 72/02
See application file for complete search history.

(56) References Cited

U.S. PATENT DOCUMENTS

| | | | | |
|---|---|---|---|---|
| 2016/0337873 | A1* | 11/2016 | Zhou | H04W 36/0061 |
| 2016/0338060 | A1* | 11/2016 | Zhou | H04W 48/16 |
| 2016/0338086 | A1* | 11/2016 | Zhou | H04W 24/08 |
| 2018/0242339 | A1* | 8/2018 | Choudhary | H04W 4/80 |
| 2019/0327675 | A1* | 10/2019 | Takeuchi | H04W 76/14 |
| 2019/0342640 | A1 | 11/2019 | Bartier et al. | |
| 2020/0186187 | A1* | 6/2020 | Suzuki | H04W 72/04 |

FOREIGN PATENT DOCUMENTS

JP   2017-11701 A   1/2017

* cited by examiner

*Primary Examiner* — Jae Y Lee
(74) *Attorney, Agent, or Firm* — Finnegan, Henderson, Farabow, Garrett & Dunner, LLP (57) ABSTRACT

One embodiment of the present invention is a wireless communication system including at least a first wireless communication device and a second wireless communication device that periodically switch a reception channel and wirelessly communicate. The first device detects an overlap schedule period during which the first device and the second device use an identical reception channel, based on use schedule periods of the reception channel of both the devices, determines to extend or reduce the use schedule period of the reception channel of the first device, based on the detected overlap schedule period, adjusts the use schedule period of the reception channel of the first device so as to be extended or reduced according to the determination, and switches the reception channel at an expiration time point of the adjusted use schedule period.

16 Claims, 9 Drawing Sheets

WIRELESS COMMUNICATION SYSTEM, WIRELESS COMMUNICATION DEVICE, AND NON-TRANSITORY STORAGE MEDIUM

CROSS-REFERENCE TO RELATED APPLICATION (S)

This application is based upon and claims the benefit of priority from Japanese Patent Application No. 2020-116581, filed Jul. 6, 2020; the entire contents of which are incorporated herein by reference.

FIELD

An embodiment relates to a wireless communication system, a wireless communication device, and a non-transitory storage medium.

BACKGROUND

There is a wireless multi-hop network which includes multiple wireless communication devices and in which a packet is transferred through the wireless communication devices exist between a source and a destination of the packet. Because of its ability to provide a wide range communication service, the wireless multi-hop network is applied to a smart mater network that achieves remote reading meters such as of electricity, gas and running water in an urban area by connecting the meters.

In a wireless multi-hop network, it is proposed to reduce adverse effects of interference radio waves from the outside of the network by executing channel hopping. In the channel hopping, a reception channel can be switched according to a channel hopping schedule and a channel hopping timing that are different among the wireless communication devices. Accordingly, each wireless communication device periodically advertises the channel hopping schedule and the channel hopping timing to the other wireless communication devices and, when transmitting data to another wireless communication device, identifies the reception channel of a wireless communication device that is to receive a packet next and determines a transmission channel.

However, a plurality of adjacent wireless communication devices may unfortunately select the same reception channel at a certain time. In such a case, packet transmission to these wireless communication devices fails by collision of radio waves. A method is proposed that if there is a time slot in which the reception channels overlap each other, the reception channel scheduled to be used is changed in order to prevent the failure, and avoids the overlapping. However, change in reception channel scheduled to be used causes a great effect. This requires to readvertise the changed channel hopping schedule to adjacent wireless communication devices, thus possibly consuming a wireless communication band.

DETAILED DESCRIPTION

One embodiment of the present invention provides a wireless communication system that can reduce notifications about change in reception channel in comparison with a conventional case, for executing channel hopping.

One embodiment of the present invention is a wireless communication system including at least a first wireless communication device and a second wireless communication device that periodically switch a reception channel and wirelessly communicate. The first wireless communication device detects an overlap schedule period during which the first wireless communication device and the second wireless communication device use an identical reception channel, based on use schedule periods of the reception channel of both the wireless communication devices, determines to extend or reduce the use schedule period of the reception channel of the first wireless communication device, based on the detected overlap schedule period, adjusts the use schedule period of the reception channel of the first wireless communication device so as to be extended or reduced according to the determination, and switches the reception channel at an expiration time point of the adjusted use schedule period.

An embodiment will be explained in detail below with reference to the accompanying drawings. The present invention is not limited to the embodiment.

One Embodiment of Present Invention

Figure 1:
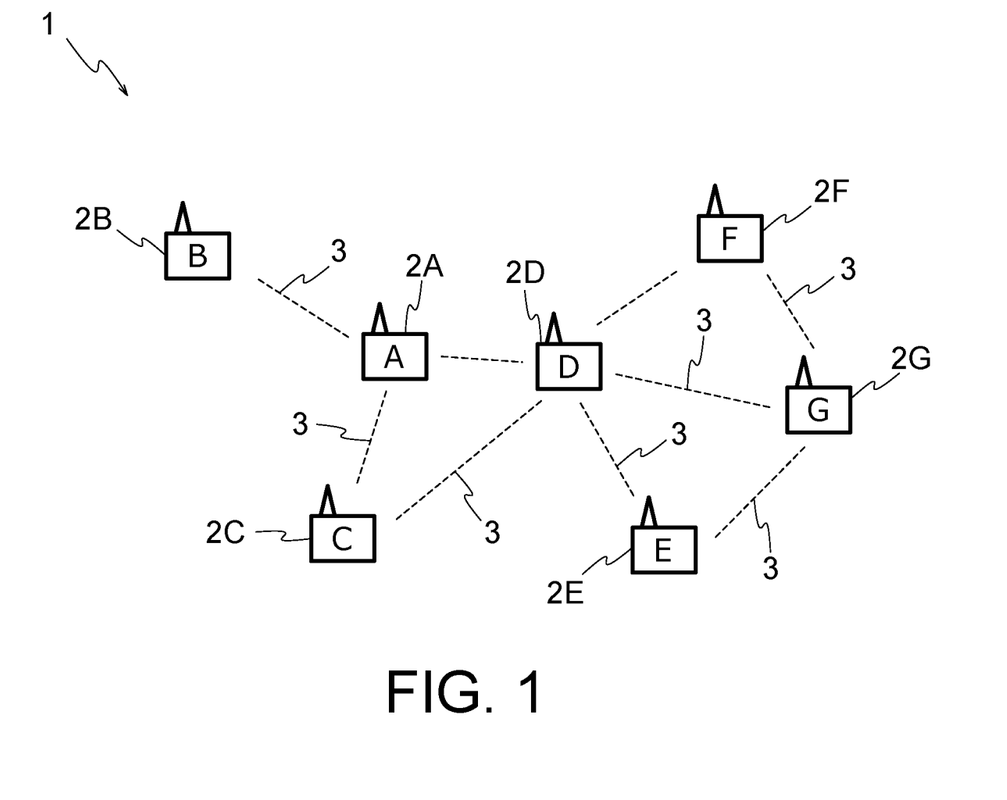
FIG. 1 illustrates an example of a wireless communication system according to one embodiment of the present invention.

FIG. 1 illustrates an example of a wireless communication system according to one embodiment of the present invention. As illustrated in FIG. 1, the wireless communication system 1 is a wireless network that includes multiple wireless communication devices 2. In this description, the wireless communication devices 2 belonging to the wireless communication system 1 are also denoted as nodes 2.

The wireless communication system 1 uses a wireless multi-hop network technology. This technology connects the multiple nodes 2 to each other, and can transfer data. Links 3 represented by broken lines in FIG. 1 indicate that nodes 2 residing at the opposite ends of each of the links 3 can directly wirelessly communicate. Note that alphabetical symbols are used to discriminate individual nodes 2 from each other.

For example, a node 2A in FIG. 1 can transmit a packet that stores data directly to nodes 2B, 2C and 2D through wireless radio waves. On the other hand, even nodes 2 that are not connected by the links 3 can indirectly wirelessly communicate via other nodes 2. For example, to transmit a packet from the node 2B to a node 2G, the packet is transferred by the node 2A and the node 2D, and reaches the node 2G.

Note that in this description, nodes connected by the links 3 are described as "adjacent nodes". For example, the nodes 2B, 2C and 2D are adjacent nodes of the node 2A. However, the node 2G is not an adjacent node of the node 2A.

The term "Own node" means itself as seen by the node, and the term "other nodes" means any node other than itself, as seen by the node. For example, for the node 2A, the node 2A corresponds to the own node, and the nodes 2B, 2C and 2D correspond to other nodes. For example, if there is a description "each node 2 refers to information on the own node", the node 2A refers to information on the node 2A, and the node 2B refers to information on the node 2B.

The wireless communication system 1 uses a channel hopping technology. Channel hopping means periodical switching of a channel (predetermined frequency band) for receiving a packet in wireless communication. Hereinafter, a channel for receiving a packet is described as "reception channel". That is, each node 2 periodically switches the reception channel.

Specifically, each node 2 switches the reception channel, based on a channel hopping schedule indicating a reception channel to which switching is scheduled, and on a channel hopping timing indicating a time at which the reception channel is switched. That is, the channel hopping schedule and the channel hopping timing can vary among the individual nodes 2.

The node 2 transmitting a packet is required to cause a channel for transmitting the packet to be identical to the reception channel of the node 2 that is to receive the packet next. Hereinafter, a channel for transmitting a packet is described as "transmission channel". That is, each node 2 is required to transmit a packet using, as the transmission channel, a channel identical to the reception channel of the node 2 that is to receive the packet next. Note that the node 2 that is to receive the packet next means, for example, a node 2 to which the packet is transferred if the packet cannot be directly transmitted to the node 2 that is the actual destination. For example, when the node 2A transmits a packet destined for the node 2G, the node 2D serves as the node that is to receive the packet next.

Accordingly, each node 2 periodically advertises information about the channel hopping schedule and the channel hopping timing, to the other nodes, and shares the information. For transmitting the packet, each node 2 refers to the information, identifies the reception channel of a node 2 that is to receive the packet next, and determines the transmission channel.

Hereinafter, information that each node 2 notifies to the other nodes for channel hopping, such as the channel hopping schedule and the channel hopping timing, is described as "channel information", and notification about the channel information to the other nodes is described as "channel advertisement". That is, the channel information includes the channel hopping schedule and the channel hopping timing. Each node 2 periodically executes channel advertisement.

The channel advertisement is typically performed through broadcast, but may be performed through unicast instead. That is, description of advertisement does not limit the transmission scheme to broadcast. The advertisement may be simply replaced with transmission. The packet may be transmitted only for channel advertisement. A header may be added to a packet to be transmitted for a purpose other than for channel advertisement, and channel advertisement may be performed using the header.

Figure 2:
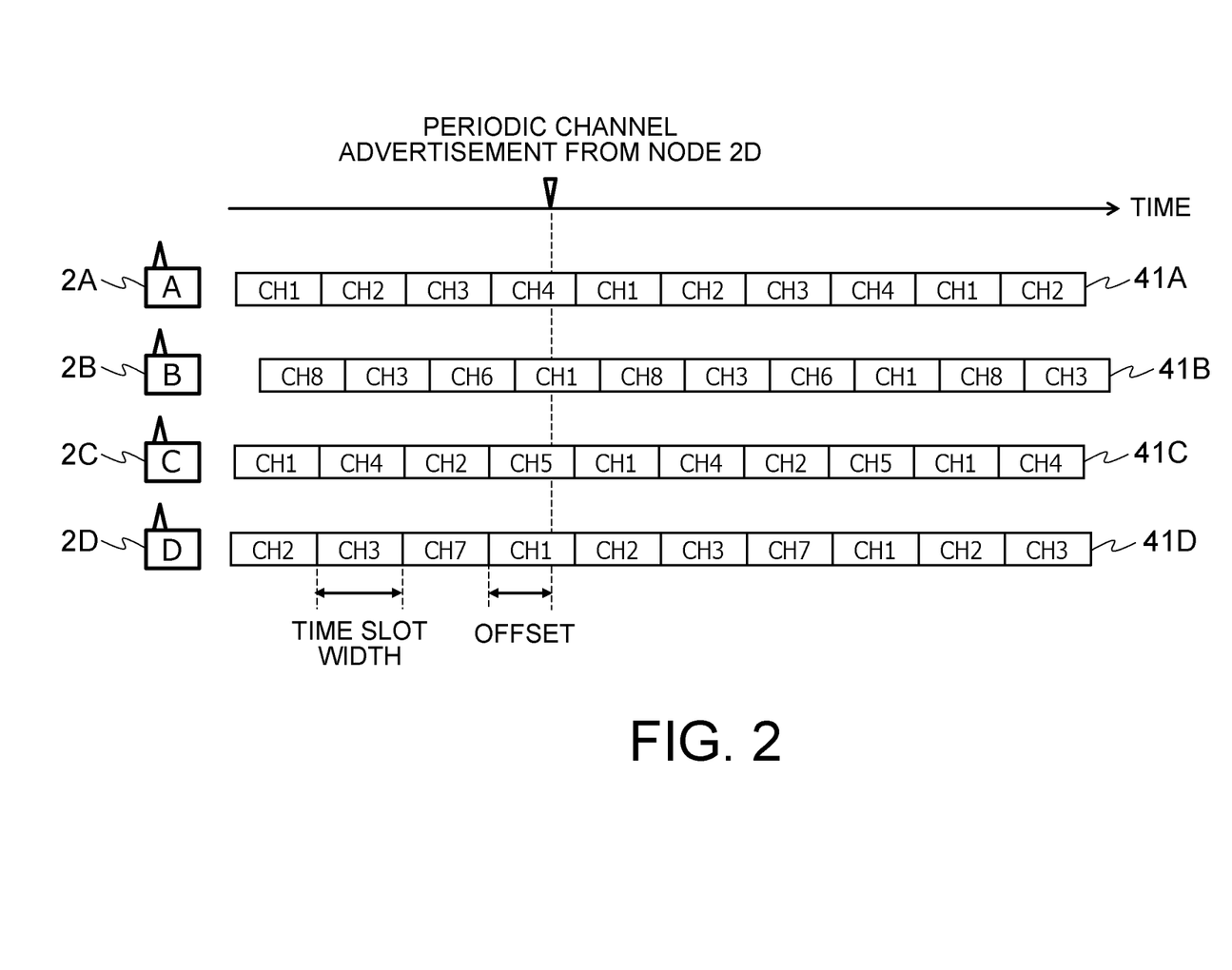
FIG. 2 illustrates channel hopping.

FIG. 2 illustrates channel hopping. FIG. 2 illustrates sequences 41 at the node 2A and its adjacent nodes. The sequences 41 are visual representation of the channel hopping schedule and the channel hopping timing, for illustrating the reception channel scheduled to be used. Note that alphabetical symbols of the sequences 41 correspond to the respective alphabetical symbols of the nodes 2.

Segmentation in the sequences 41 represents the channel hopping timing, and indicates that the reception channel is switched at this time point. That is, the period between two channel hopping timings means a period during which one channel is continuously used, in other words, a use schedule period for a certain channel. The period is described as a time slot. The time length of the time slot is described as "time slot width".

As can be seen by the sequences 41 in FIG. 2, the channel hopping timing is not necessarily the same among the individual nodes 2. The time slot width may be the same or different among the individual time slots. The time slot widths of the individual nodes 2 may be identical to or different from each other.

Each channel hopping timing may be directly represented by a time. Alternatively, the timing may be indirectly represented by the start time of the leading time slot and the time slot width of each time slot. That is, the channel hopping timing may be represented by information allowing the time of channel hopping timing to be calculated, such as a reference time and the time slot width.

In each time slot in FIG. 2, a reception channel used in the corresponding time slot is indicated. For example, the sequence 41A indicates that the reception channel of the node 2A is scheduled to be switched in an order of "CH1", "CH2", "CH3" and "CH4".

Note that the sequence 41A returns to "CH1" after use of "CH4", and the channel is switched in the order of "CH1", "CH2", "CH3" and "CH4" again. That is, [CH1, CH2, CH3, CH4] are regarded as one set. The reception channel is switched sequentially from the initial channel in this set. After the last channel is used, the order returns to the first channel, and the channel to be used is sequentially switched again. In the case where the reception channel is periodically changed as described above, the channel hopping schedule may be represented only by a permutation of reception channels in the set in the channel advertisement. For example, the channel hopping schedule of the node 2B may be represented as [CH8, CH3, CH6, CH1]. The number of reception channels in the set is described as "length of the channel hopping schedule". In the example in FIG. 2, the length of the channel hopping schedule of each node 2 is "4".

In the channel advertisement, all the reception channels to a certain time may be sequentially represented. For example, the channel hopping schedule of the node 2B to the next channel advertisement may be notified as [CH8, CH3, CH6, CH1, CH8, CH3].

Note that the index in the channel hopping schedule is called a time slot index. For example, in a case where the channel hopping schedule is [CH1, CH2, CH3, CH4], the channel with a time slot index of "0" corresponds to "CH1", and the channel with a time slot index of "1" corresponds to "CH2".

A transmission offset illustrated in FIG. 2 means a time length between a time point at which an adjacent node transmits channel advertisement and the channel hopping timing immediately previous from this time point of the adjacent node. The transmission offset may be included in the channel advertisement. For example, for transmitting channel advertisement, the node 2D may calculate the value of the transmission offset, include the value in the channel advertisement, and transmit this advertisement to the node 2A. The time slot index of the reception channel that is in use when the channel advertisement is transmitted is described as "transmission time slot index". In the example in FIG. 2, at a time point when the node 2D transmits the channel advertisement, the node 2D uses "CH1". Accordingly, the transmission time slot index corresponds to the time slot index of "CH1". The transmission time slot index may also be included in the channel advertisement.

In FIG. 2, for example, in the fifth time slot of the sequence 41A and the fourth time slot of the sequence 41B, there is a period during which both the nodes 2A and 2B use "CH1" as the reception channel. A period during which at least two of the own node and adjacent nodes use the same reception channel as described above is described as "overlap schedule period". In the overlap schedule period, possible transmission of a packet to each node 2 related to this overlap schedule period can cause radio wave collision, and the transmission can fail.

To prevent this failure, each node 2 in this embodiment detects the overlap schedule period on the basis of the channel hopping schedules and the channel hopping timings of the own node and the adjacent nodes. If the overlap schedule period is detected, a process of resolving the overlap schedule period is executed.

Note that there is a method of resolving the overlap schedule period by changing the reception channel scheduled to be used. To prevent packet transmission using the reception channel having not been changed yet, this method is required to advertise a changed reception channel besides periodical channel advertisement. Accordingly, a wireless communication band is more consumed than a case without any overlap schedule period. Consequently, in this embodiment, another method is used and changes the reception channel scheduled to be used as little as possible.

Figure 3:
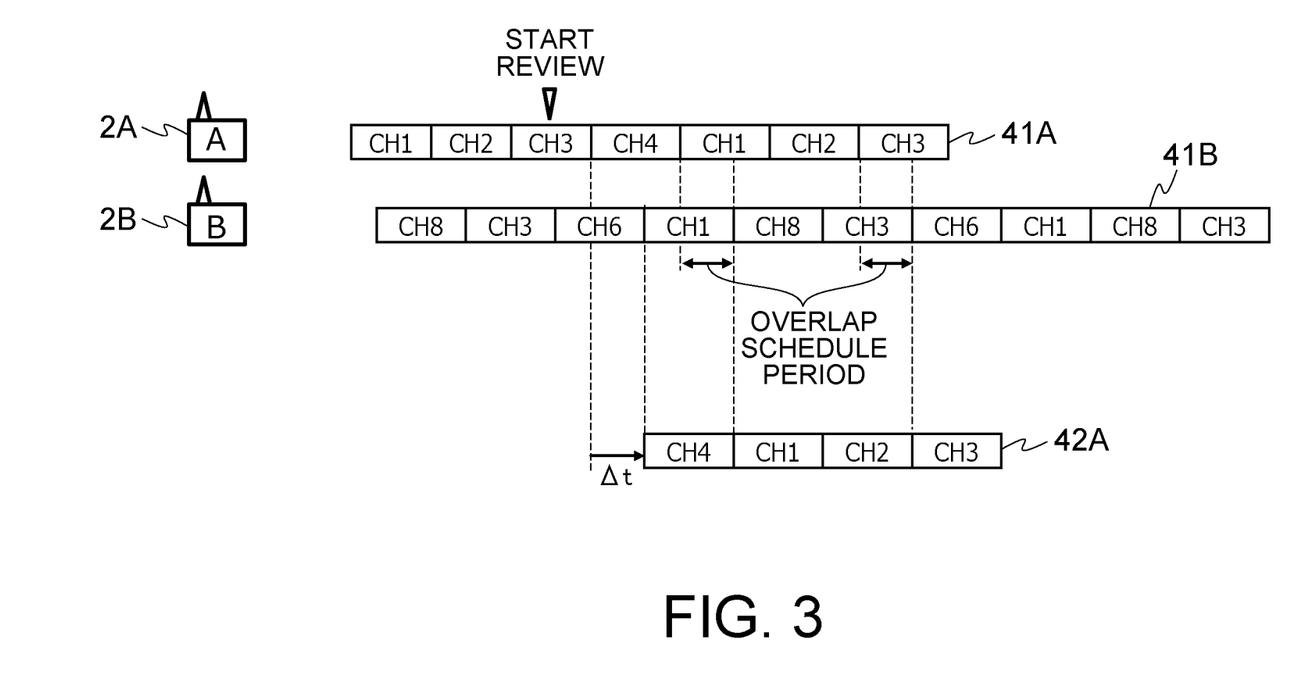
FIG. 3 illustrates a process of resolving an overlap schedule period.

FIG. 3 illustrates a process of resolving an overlap schedule period. In the example in FIG. 3, only the nodes 2A and 2B are considered. As can be seen by the sequences 41A and 41B in FIG. 3, there is an overlap schedule period in "CH1" and "CH3". Transition of the channel hopping timing by the node 2A before the overlap schedule period arrives can in some cases resolve the overlap schedule period. For example, the sequence 42A in FIG. 3 is achieved by delaying, by "Δt", the channel hopping timing immediately next to the time point indicated as "START REVIEW" in the sequence 41A. The sequence 42A and the sequence 41B have no overlap schedule period. As described above, in this embodiment, to resolve the overlap schedule period, the channel hopping timing is caused to transition. In other words, adjustment that delays or advances the channel hopping timing is executed.

However, even adjustment of the channel hopping timing cannot resolve the overlap schedule period in some cases. In such cases, the reception channel may be changed. The channel hopping timing may be adjusted to reduce the overlap schedule period, and the reception channel may then be changed.

As indicated as "Δt" in FIG. 3, a time length by which the channel hopping timing is delayed or advanced to resolve the overlap schedule period is described as "total adjustment width". When the channel hopping timing is advanced, the value of the total adjustment width is represented with minus. When the channel hopping timing is delayed, the value of the total adjustment width is represented with plus.

The adjustment of the channel hopping timing can be achieved by adjusting the time slot width. To advance the channel hopping timing, the time slot width may be reduced. To delay the channel hopping timing, the time slot width may be extended.

As the sequence 41A is replaced with the sequence 42A in the example in FIG. 3, the node 2A synchronizes the channel hopping timing with the channel hopping timing of the node 2B. Hereinafter, as with the node 2B for the node 2A, a node 2 serving as a reference for synchronizing the channel hopping timing is described as "synchronization target node". That is, in the example in FIG. 3, the synchronization target node of the node 2A is the node 2B.

There is, however, a possibility that even if the channel hopping timing of the node 2A is adjusted, the node 2B that does not recognize the adjustment performs packet transmission using an erroneous transmission channel. For example, if the node 2A delays the channel hopping timing from "CH3" to "CH4", in the delayed period the node 2B unaware of the delay recognizes that the node 2A has switched the reception channel to "CH4" as scheduled, and performs packet transmission using "CH4" as the transmission channel. On the other hand, if the node 2A temporarily executes channel advertisement to notify that the channel hopping timing is delayed, the wireless communication band is unnecessarily consumed by the advertisement, as with change in channel. Accordingly, in this embodiment, adjustment is performed that is required to execute channel advertisement as little as possible besides periodic channel advertisement.

Figure 4:
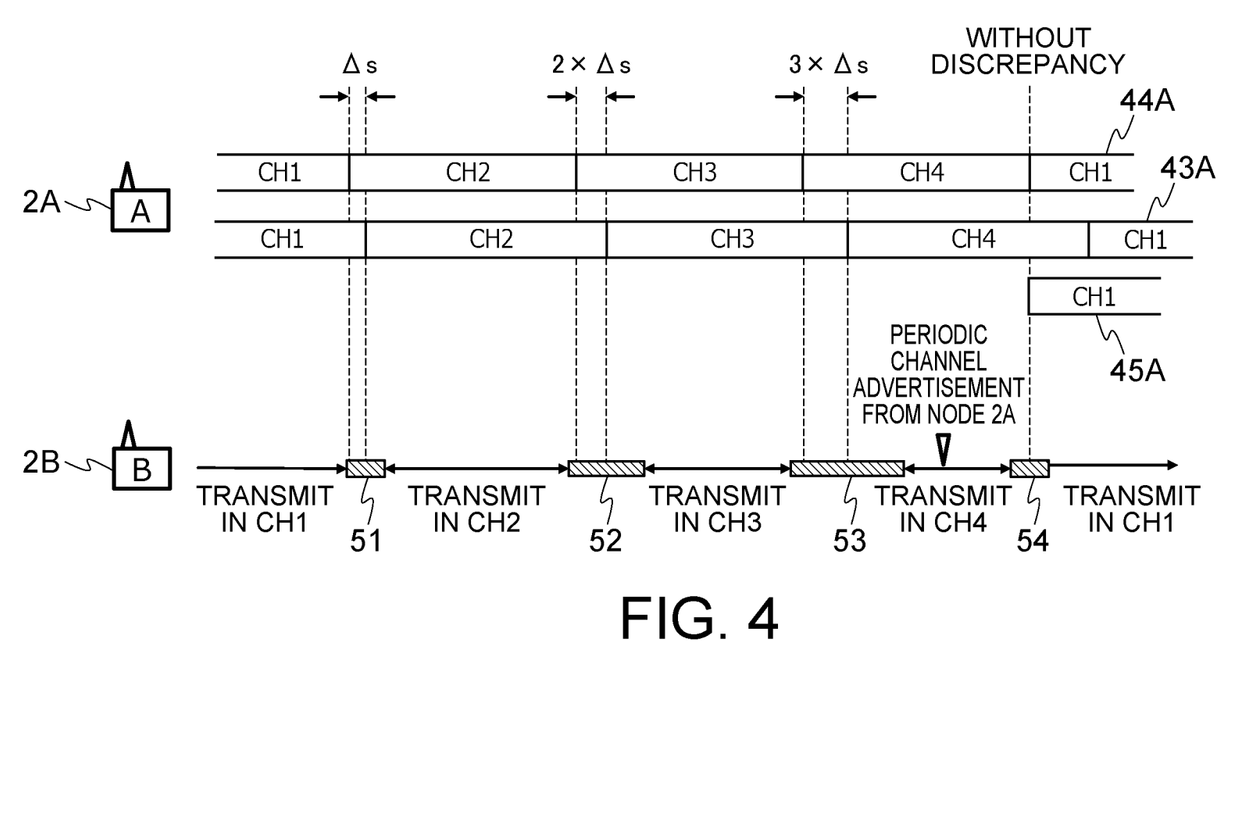
FIG. 4 illustrates adjustment.

FIG. 4 illustrates adjustment of the time slot. FIG. 4 illustrates sequences 43A to 45A. The sequence 43A is a sequence of the node 2A that the node 2B recognizes by channel advertisement. The sequence 44A is an actual sequence of the node 2A. The sequence 45A is a sequence of the node 2A that the node 2B newly recognizes through periodic channel advertisement by the node 2A.

As illustrated in FIG. 4, the channel hopping timing of the sequence 44A is earlier than that of the sequence 43A. This is because the node 2A advances the channel hopping timing by "Δs" for every time slot. In other words, the node 2A reduces the time slot width by "Δs". Accordingly, the deviation between the sequence 43A and the sequence 44A gradually increases.

Note that as with "Δs" indicated in FIG. 3, the difference between the time slot widths before and after adjustment is described as "adjustment width". Unlike FIG. 3, the adjustment width may be different among the individual time slots. Similar to the total adjustment width, when the channel hopping timing is advanced, the value of the adjustment width is represented with minus. When the channel hopping timing is delayed, the value of the adjustment width is represented with plus. Note that a time slot width having not been adjusted yet, that is, an initial value of the time slot width is described as a base time slot width.

As described above, the base time slot width may be different among the individual nodes 2, or may be common among the individual nodes 2 for the sake of convenience of processing. The base time slot width may be preliminarily defined as setting of the wireless communication system 1, and the base time slot width may be set in each node 2 when the corresponding node 2 is connected to the wireless communication system 1. Alternatively, when the synchronization target node is determined, the base time slot width of the own node may be fitted to the base time slot width of the synchronization target node.

FIG. 4 illustrates transmission prohibition periods 51 to 54. The transmission prohibition periods 51 to 54 indicate periods during which packet transmission to the node 2A is prohibited.

Each node 2 executes channel hopping on the basis of the own clock. However, typically, the accuracies of clocks implemented by crystal oscillators or the like are different among individual clocks. Accordingly, the channel hopping timing of each node 2 is not strictly correct, and is delayed or advanced. In other words, the actual channel hopping timing has a discrepancy before and after a scheduled time.

By receiving channel advertisement from the adjacent node, each node 2 can recognize the transmission offset time of the adjacent node, that is, a time point at which the adjacent node is in the sequences 41. However, due to an effect of clock drift, the time elapses from last reception of the channel advertisement, and channel hopping timing of the recognized adjacent node has a discrepancy from an actual timing.

That is, the node 2A does not execute the channel hopping at the channel hopping timing in a strict sense. The node 2B does not strictly recognize the channel hopping timing of the node 2A.

Due to such a discrepancy, packet transmission can fail. For example, a case can occur where although the node 2A determines that the scheduled time of the channel hopping timing of the own node has arrived and switches the reception channel, the scheduled time has not arrived yet in actuality. Accordingly, the reception channel of the node 2A can in some cases be wrong. Furthermore, a case can occur where although the node 2B determines that the channel hopping timing of the node 2A has already arrived the scheduled time of the channel hopping timing of the node 2A, the time has not arrived yet in actuality. Accordingly, the transmission channel of the node 2B to the node 2A can be different from the actual one. To avoid such possible difference, the channel hopping is provided with the transmission prohibition period as illustrated in FIG. 4.

The lengths of the transmission prohibition periods 51 to 54 to the node 2A are determined based on the clock drift of the node 2A, and gradually increase until the channel advertisement is received. The clock drift represents the size of discrepancy (delay or advance) from an actual time that occurs per unit time. The time of another node can be recognized by channel advertisement. Accordingly, the magnitude of discrepancy of the clock at the expiration time point of the N-th time slot ("N" is an integer equal to or larger than "1") is represented as "(expiration time point of N-th time slot−channel advertisement reception time point)× clock drift of other node". Note that it is unknown whether the discrepancy is backward or forward. Accordingly, it is preferable to provide the transmission prohibition period such that time segments before and after the channel hopping timing can be in the transmission prohibition period. For example, it is preferable to determine the transmission prohibition period such that the channel hopping timing is at the middle of the transmission prohibition period, and the length of the transmission prohibition period is at least twice longer than the magnitude of the discrepancy of the clock, as illustrated in FIG. 4.

In consideration of the clock drift of the own node, the transmission prohibition period may be determined. For example, in calculation of the magnitude of the discrepancy of the clock, "clock drift of other node" may be replaced with "clock drift of other node+clock drift of own node". Note that the clock drifts of the own node and the other node have a positive value in a case of delay, and a negative value in a case of advance.

Note that each node 2 is configured to be capable of preliminarily recognizing the transmission prohibition periods of the own node and the adjacent nodes. For example, through a process of connection to the wireless communication system 1, periodic channel advertisement and the like, each node 2 may notify a method of determining the transmission prohibition period, the clock drift of this node and the like to the other nodes 2. Alternatively, each node 2 may calculate the transmission prohibition period of the own node, and notifies the period to the other nodes. As described above, it is assumed that the node 2A and the node 2B in FIG. 4 successfully recognize the transmission prohibition period of the node 2A.

This embodiment adjusts the channel hopping timing using the transmission prohibition period. As illustrated in FIG. 4, the node 2A adjusts the channel hopping timing to be in the transmission prohibition period. That is, the adjustment width "Δs" is set to be shorter than half a transmission prohibition period width.

FIG. 4 illustrates channels that the node 2B uses for transmission to the node 2A in the transmission prohibition periods 51 to 54. These illustrate that the entire transmission is performed in the same channels as the reception channels of the node 2A. As described above, transition of the channel hopping timing in the transmission prohibition period can prevent the node 2B from transmitting a packet using a channel different from the actual reception channel.

As described above, the node 2A transmits channel hopping timing to be used thereafter, through periodic channel advertisement. Consequently, after receipt of channel advertisement, the node 2B recognizes the correct channel hopping timing, that is, the adjusted time slot width. In the example in FIG. 4, after receipt of the channel advertisement, the node 2B recognizes the channel hopping timing of the node 2A on the basis of the sequence 45A instead of the sequence 43A. Consequently, a situation can be avoided where the node 2A switches the reception channel from "CH4" to "CH1" and subsequently the node 2B transmits a packet to the node 2A using "CH4".

Note that the magnitude of the clock drift is significantly smaller than the time slot width. Accordingly, with the upper limit of the adjustment width as described above, it is assumed that a considerable time period is required to resolve the overlap schedule period. The time slot width has a magnitude in units of milliseconds. Accordingly, the total adjustment width "At" is smaller than the time slot width, but is assumed to have a magnitude in units of milliseconds. On the other hand, the clock drift is typically in units of ppm. Consequently, a considerable number of adjustments are required to resolve the overlap schedule period.

Accordingly, each node 2 may notify, as the clock drift, a value larger than the actual clock drift, instead of notifying the actual clock drift. For example, the maximum value advertisable as the clock drift may be notified as the clock drift. Accordingly, a long transmission prohibition period can be set. This clock drift different from the actual clock drift is described as "advertisement clock drift". Increase in transmission prohibition period reduces the time period communicable in the time slot. However, the time period to resolve the overlap schedule period is long as described above. Accordingly, such increase is effective to reduce the time period, if only a little.

For example, it is assumed that the base time slot width of each node 2 is 100 milliseconds, the actual clock drift of the node 2A is 100 ppm, and the advertisement clock drift is 254 ppm. The clock drift is a discrepancy from the actual time that occurs per unit time period. Accordingly, the discrepancy after lapse of one time slot is represented as time slot width×clock drift. Accordingly, the discrepancy based on the advertisement clock drift is 100 milliseconds× 254 ppm=25.4 microseconds, and the discrepancy based on the actual clock drift is 100 milliseconds×100 ppm=10.0 milliseconds. Consequently, adjustment based on the advertisement clock drift can achieve extension or reduction by 15.4 microseconds for each time slot. Thus, the time period required to resolve the overlap schedule period can be reduced, if only a little.

Note that it may be determined whether to adjust the channel timing or to change the channel. For example, in adjustment of the channel timing, the time period required to resolve the overlap schedule period is long. The channel changing results in increase in communication traffic. Consequently, based on the time period required to resolve the overlap schedule period, and a result of a calculation expression that includes the amount of increase in communication traffic in variables, it may be determined whether to execute channel timing adjustment or channel changing.

If the time slot width has already been adjusted, the overlap schedule period may be detected by calculation based on a sequence in a case where the adjusted time slot width is continuously kept, or by calculation based on a sequence in a case where the time slot width is returned to that of the base time slot. If calculation is based on the sequence in the case where the adjusted time slot width is continuously kept, it should be noted that the sum of the current adjustment width "Δs" and the adjustment width "Δs" calculated this time is adopted as the adjustment width "Δs" for the base time slot.

Note that multiple adjacent nodes may be adopted as the synchronization target nodes, and the overlap schedule periods with the respective synchronization target nodes may be comprehensively resolved. However, in this case, it is more difficult to resolve all the overlap schedule periods with the respective synchronization target nodes only by changing the channel hopping timing than the case with one synchronization target node. Accordingly, a determination reference for determining which overlap schedule period is preferentially resolved may be predetermined, and the overlap schedule period to be resolved based on the determination reference may be selected.

For example, the overlap schedule period to be resolved may be selected based on determination references that include the priorities defined for the respective nodes 2, the length of the total adjustment width of the overlap schedule periods, the number of time slots required to be changed in channel, and the number and lengths of overlap schedule periods remaining after adjustment. Based on a calculation expression that includes multiple determination references in variables, the score after the selected overlap schedule period is resolved may be calculated, and the overlap schedule period to be resolved based on the score may be selected. The values of weights on these variables may be appropriately defined. For example, the values of the weights may be determined according to the magnitude of the communication traffic, specifically, the total number, the total capacity or the like of packets or data items exchanged with the target nodes 2 in the latest unit time. Such determination can take priority on the node 2 that seems to be important for the own node.

Figure 5:
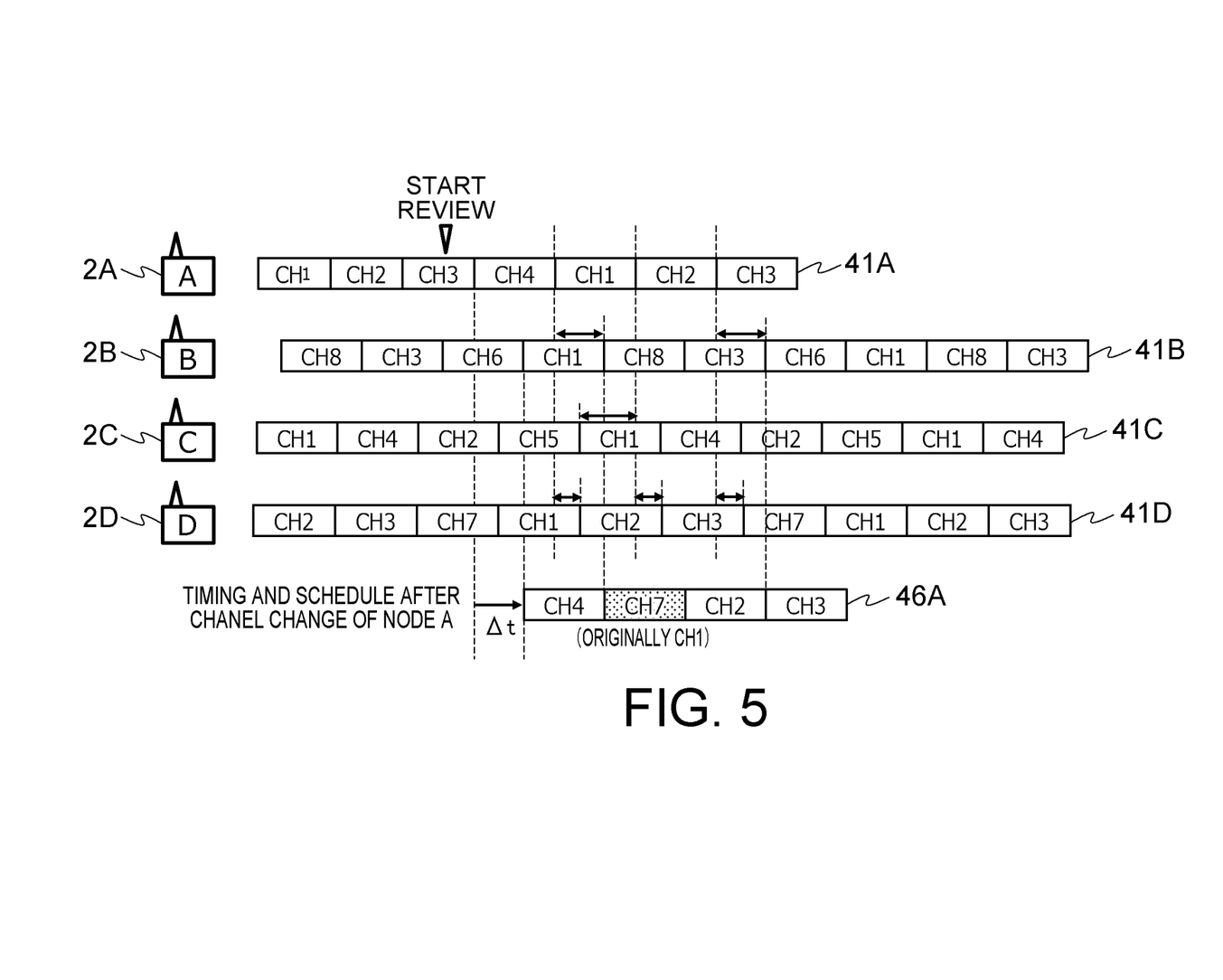
FIG. 5 illustrates adjustment.

FIG. 5 illustrates a process of resolving overlap schedule periods of multiple synchronization target nodes. In an example in FIG. 5, the nodes 2B to 2C are adopted as the synchronization target nodes of the node 2A. As illustrated in the sequences 41A to 41D in FIG. 5, there are one or more overlap schedule periods at each synchronization target node. Not all the overlap schedule periods can be resolved by adjusting the channel hopping timing. Accordingly, the node 2A ignores the overlap schedule period with the node 2C, delays the channel hopping timing of "CH4" by "Δt" as indicated in the sequence 46A, and resolves two overlap schedule periods with the node 2B and three overlap schedule periods with the node 2D. The overlap schedule period with the node 2C is resolved by changing "CH1" to "CH7". Note that in this case, the changed channel hopping schedule is rapidly advertised to the adjacent nodes.

Figure 6:
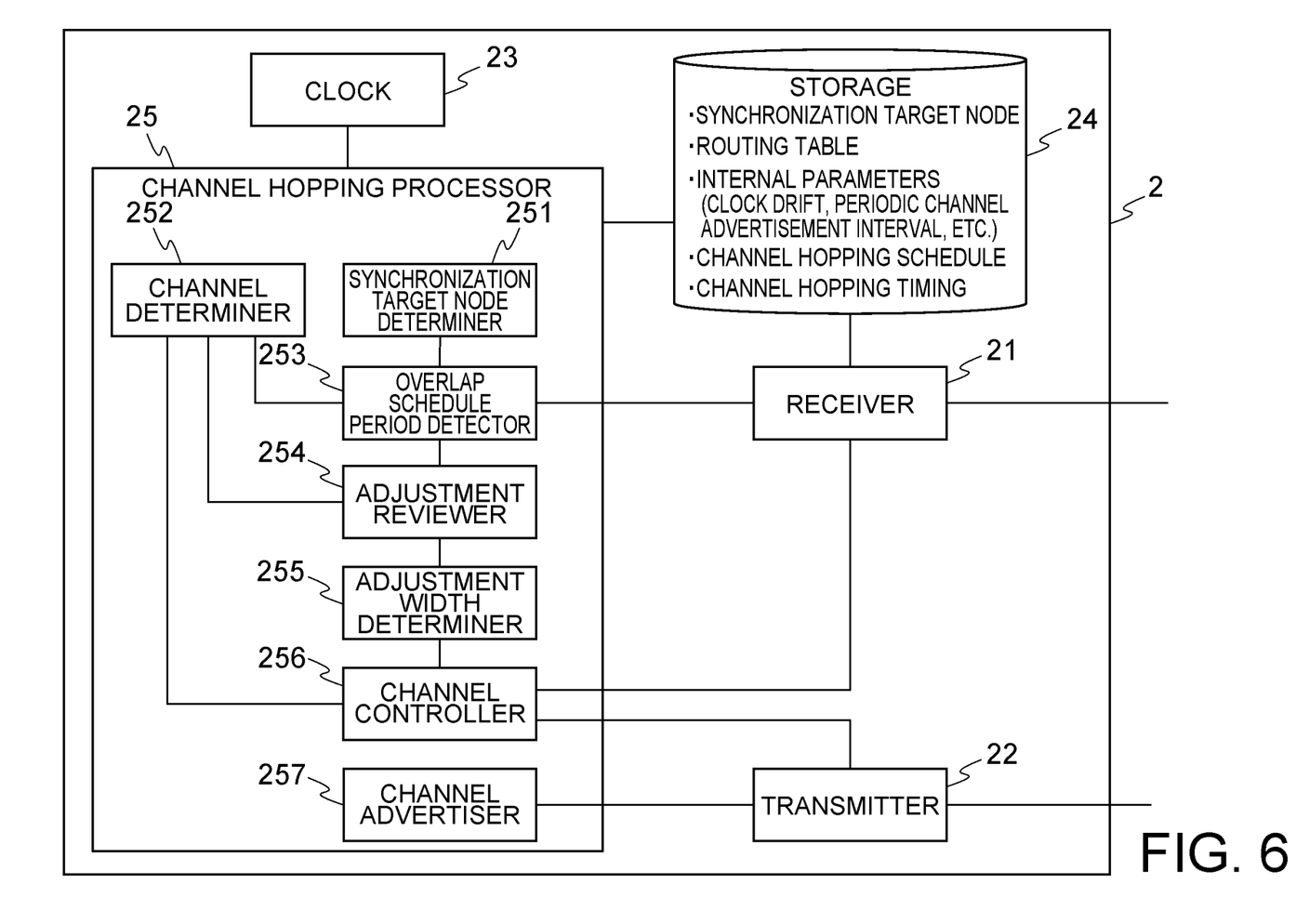
FIG. 6 illustrates an example of the internal configuration of the node 2.

The internal configuration of the node 2 is described. FIG. 6 illustrates an example of the internal configuration of the node 2. The node 2 includes a receiver 21, a transmitter 22, a clock 23, a storage 24, and a channel hopping processor 25. The channel hopping processor 25 includes a synchronization target node determiner 251, a channel determiner 252, an overlap schedule period detector 253, an adjustment reviewer 254, an adjustment width determiner 255, a channel controller 256, and a channel advertiser 257.

Note that the configuration elements in FIG. 6 are assumed to be required to perform channel hopping. Configuration elements for executing processes, such as data communication, performed by a typical wireless communication device are omitted. The configuration elements illustrated in FIG. 6 may be segmentalized or integrated. For example, the storage 24 may be provided for each of data types to be stored.

The receiver 21 receives a wireless signal using a reception channel designated by the channel controller 256, picks up a packet from the wireless signal, and takes data from the packet. The taken data is transmitted to the storage 24, the channel hopping processor 25 and the like. The channel hopping schedule and the channel hopping timing included in the channel advertisement from the adjacent node are thus obtained.

The transmitter 22 converts the provided data into a packet, and converts the packet into a wireless signal, and transmits the signal using a transmission channel designated by the channel controller 256.

The clock 23 provides the current time for the configuration elements of the node 2. As described above, in the case where the clock 23 is implemented by a crystal oscillator or the like, the clock drift is considered in adjustment of the channel hopping timing.

The storage 24 stores data and the like required to operate the node 2. For example, data included in the received channel advertisement and the like, network information for transmitting the packet, a processing result of each configuration element of the own node, internal parameters of the own node and the like can be stored.

For example, the received data includes the channel hopping schedules, the channel hopping timings, the time slot widths, and the clock drifts of the adjacent nodes. The channel advertisement reception time, the transmission time slot index, the transmission offset and the like are also included in the channel advertisement. Similar to a table in a database, these items may be stored in association with each other. The channel advertisement reception time is a time at which the channel hopping timing and the like are received from the adjacent node. The time is based on measurement by the clock 23 of the own node. The transmission time slot index is a time slot index on the channel hopping schedule of the adjacent node at a time point when the adjacent node transmits the channel hopping timing and the like.

For example, the network information includes a communication path (routing table) for delivering the packet to the destination, and an IP address of each node 2. A processing result includes, for example, the adjustment width, and the adjusted time slot width. The processing result may be stored as internal parameters. The internal parameters include the channel hopping schedule, the channel hopping timing, the actual clock drift, the advertisement clock drift, and the base time slot width.

The channel hopping processor 25 performs various processes for achieving channel hopping.

The synchronization target node determiner determines the synchronization target node from among the adjacent nodes. Determination of the synchronization target node requires determination where the network indicating the relationships between individual synchronization target nodes do not form a loop. That is, possible tracing of the synchronization target nodes is required not to return to the original node 2. Otherwise, there is a possibility that a process of changing the channel hopping timing continues endlessly without being finished. For example, in a case where the synchronization target node of the node 2A is the node 2B, and the synchronization target node of the node 2B is the node 2A, possible change of the channel hopping timings by the node 2A and the node 2B at the same time cause these nodes 2A and 2B to continuously receive notification about change in the channel hopping timing of the synchronization target node every time the channel hopping timing is changed. Accordingly, there are nodes 2 having no synchronization target node, that is, nodes 2 that do not execute change of channel hopping timing.

For example, technologies capable of constructing a wireless multi-hopping communication path without any loop include RPL (IPv6 Routing Protocol for Low-Power and Lossy Networks, RFC 6550). The synchronization target node determiner may determine the synchronization target node using such technologies. Alternatively, in a case where the communication path is determined by such technologies, each node 2 may adopt what is called a parent node (next upper node 2) on the communication path as the synchronization target node, or may adopt what is called a child node (next lower node 2) on the communication path as the synchronization target node.

The channel determiner 252 determines the channel hopping schedule and the channel hopping timing of the own node. Note that the determination method may be appropriately determined. In a case where the channel hopping schedule and the channel hopping timing are preliminarily stored in the storage 24, these may be used.

If it is determined that adjustment of the channel hopping timing cannot resolve the overlap schedule period, the channel determiner 252 changes the reception channel about the overlap schedule period, and updates the channel hopping schedule. The changing method may be appropriately determined; it is assumed that the after-mentioned overlap schedule period detector 253 is caused to verify whether a new overlap schedule period is caused by the change, and if no new overlap schedule period is caused, change in the reception channel is allowed.

The overlap schedule period detector 253 detects the overlap schedule period between the own node and the synchronization target node. First, the overlap schedule period detector 253 recognizes the time slot of the reception channel of the own node, that is, the use schedule period of the reception channel, according to the channel hopping schedule and the channel hopping timing of the own node, as indicated in the sequences illustrated in FIGS. 2 to 5. Likewise, this detector recognizes the time slot of the reception channel of the synchronization target node, according to the channel hopping schedule and the channel hopping timing of the synchronization target node. This detector then detects the overlap schedule period on the basis of the time slot of the reception channel of the own node and the time slot of the reception channel of the synchronization target node.

If the channel hopping timing of the own node has already been adjusted, the time slot of the reception channel may be recognized according to the adjusted channel hopping timing, or the time slot of the reception channel may be recognized according to the channel hopping timing having not been adjusted yet. That is, the time slot of the reception channel may be recognized according to the channel hopping timing based on the adjusted time slot width, or the time slot of the reception channel may be recognized according to the channel hopping timing based on the base time slot width.

The range where the overlap schedule period is detected may be appropriately determined. For example, all the time slots of the synchronization target node notified by the channel advertisement may be checked. In a case where the reception channel is periodically changed, the time slot until the scheduled reception time point of the next channel advertisement may be calculated on the basis of the channel hopping schedule, and the overlap schedule period may be detected. If the length of the channel hopping schedule of the synchronization target is different, time slots as many as the least common multiple of the length of the channel hopping schedule of the own node and the length of the channel hopping schedule of the synchronization target node, may be calculated.

The adjustment reviewer 254 reviews whether the detected overlap schedule period is resolvable or not by extending or reducing the time slot of the reception channel of the own node. If it is determined to be resolvable, the time slot of the reception channel of the own node is determined to be extended or reduced.

Even if there is an overlap schedule period, it may be determined that adjustment is not required. For example, it may be configured such that if the overlap schedule period is less than a predetermined threshold, adjustment is not performed.

The adjustment width determiner 255 adjusts the time slot of the reception channel of the own node so as to be extended or reduced, according to the determination of the adjustment reviewer 254. Specifically, when the time slot of the reception channel of the own node is determined to be extended or reduced, the adjustment width determiner 255 determines the adjustment width and updates the channel hopping timing of the own node. As described above, the adjustment width is determined so as to be within the length of the transmission prohibition period. Accordingly, as described above, the adjustment width determiner 255 may calculate the transmission prohibition periods of other nodes respectively on the basis of the clock drifts notified from the other nodes. For example, it may be assumed that $|\Delta S|$=base time slot width×(advertisement clock drift−actual clock drift), and the absolute value of the adjustment width may be calculated. Alternatively, the adjustment width determiner 255 may use the transmission prohibition periods notified from the other nodes.

Note that, when the time slot of the reception channel of the own node is determined to be extended or reduced, the adjustment width determiner 255 determines the total adjustment width. For example, in a case where the overlap schedule period can be resolved either by delaying or advancing the channel hopping timing, it is conceivable that the total adjustment width "$\Delta t$" when the channel hopping timing is delayed, and the total adjustment width "$\Delta t$" when the channel hopping timing is advanced are calculated, and the width having a smaller absolute value of total adjustment width "Δt" is selected. In a case where possible adjustment until the overlap schedule period being resolved causes the absolute value of the total adjustment width "Δt" to be larger than the predetermined threshold, an adjustment method that can resolve not all the overlap schedule period but has the absolute value of the total adjustment width "Δt" smaller than the predetermined threshold may be selected, and the overlap schedule period is not necessarily completely resolved accordingly.

The channel controller 256 controls the receiver 21 on the basis of the channel hopping schedule and the channel hopping timing of the own node. The channel controller 256 designates the reception channel that is to be changed at the next channel hopping timing, and the receiver 21 switches the reception channel on the basis of the designation.

The channel controller 256 controls the transmitter 22 on the basis of the channel hopping schedule and the channel hopping timing of the adjacent node. The channel controller 256 determines the reception channel of the node 2 to which the packet is to be transmitted next, on the basis of the channel hopping schedule and the channel hopping timing of the node 2, and designates the determined reception channel as the transmission channel for the packet. The transmitter 22 transmits the packet using the designated transmission channel.

The channel controller 256 determines the transmission prohibition period of the node 2 that is the data transmission destination, on the basis of the channel hopping schedule and the channel hopping timing of the node 2, and issues an instruction of transmitting no packet in the determined transmission prohibition period, thereby causing the transmitter 22 to stop transmission of the packet during the transmission prohibition period.

The channel advertiser 257 obtains data for channel advertisement from the storage 24 or the like, and provides the data for the transmitter 22. The data for channel advertisement includes the channel hopping schedule, the channel hopping timing, the time slot width, and the advertisement clock drift of the own node. The data is transmitted by the transmitter 22 to the adjacent nodes in the respective transmission channels designated by the channel controller 256.

Figure 7:
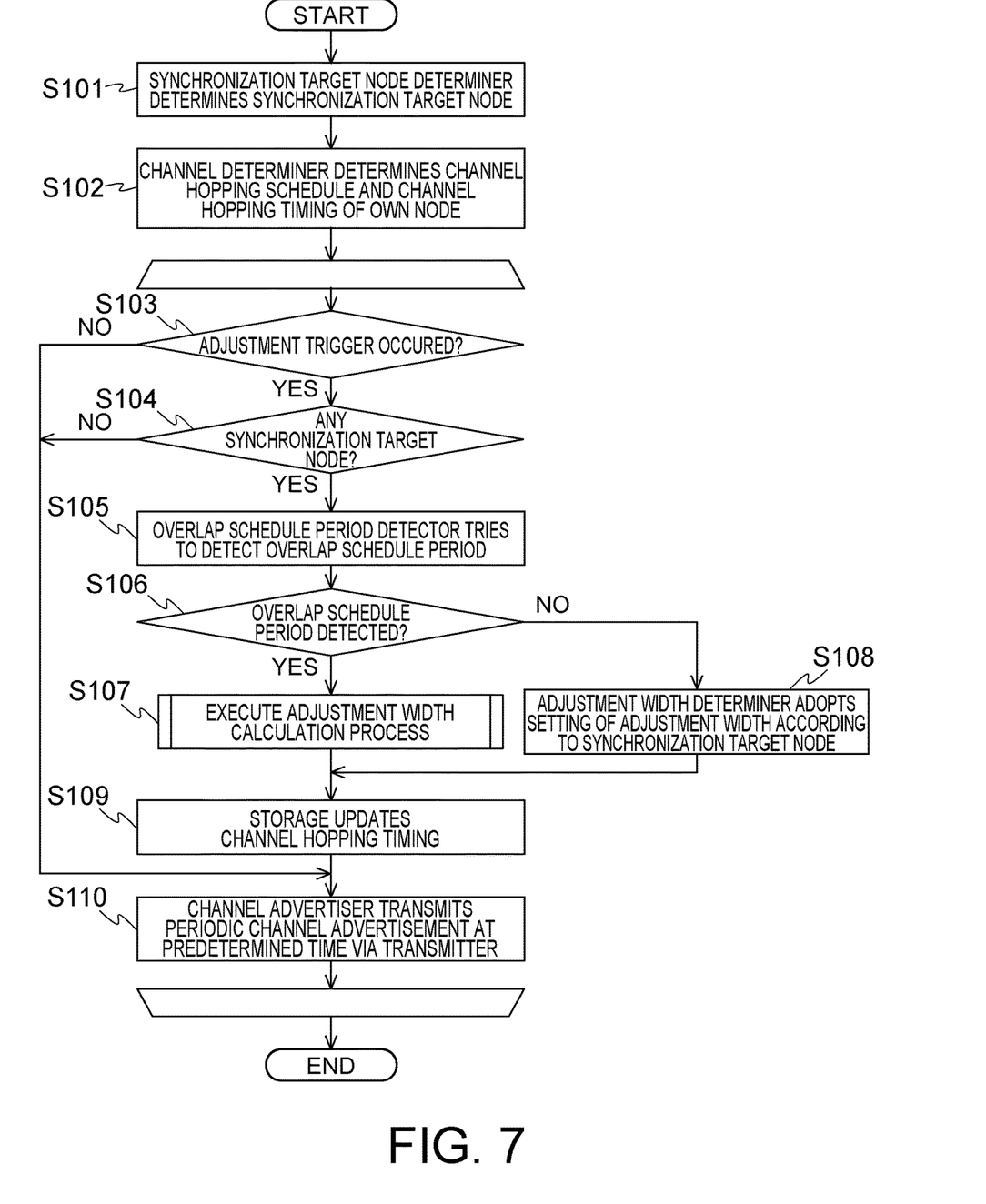
FIG. 7 is a schematic flowchart of an adjustment process.

Next, the flow of each of processes of configuration elements of the node 2 is described. FIG. 7 is a schematic flowchart of an adjustment process. Note that for the sake of convenience of description, this flow is integrated into one. Alternatively, this flow may be divided into multiple flows with reference to a trigger related to adjustment described later. If a desired result can be obtained, the sequential orders of processes may be inverted, and the processes may be performed in parallel. This also applies to flows thereafter.

First, the synchronization target node determiner determines the synchronization target node on the basis of the communication path and the like (S101). The channel determiner 252 determines the channel hopping schedule and the channel hopping timing of the own node (S102). This allows steps thereafter to detect the overlap schedule period. Note that these processes are preprocesses about adjustment of the channel hopping timing. The determined channel hopping timing is the channel hopping timing having not been adjusted yet, that is, the channel hopping timing based on the base time slot width. Another preprocess, for example, alignment of the base time slot width with that of the wireless communication system 1 or the synchronization target node may be performed. What is determined by the preprocesses may be immediately advertised to the other nodes 2.

The flow thereafter is started triggered by a fact that the scheduled time of periodic channel advertisement is reached, occurrence of a trigger pertaining to adjustment and the like, and is then repeated. In a case where no adjustment trigger occurs (NO in S103), and in a case where the adjustment trigger occurs but there is no synchronization target node (YES in S103 and NO in S104), no process pertaining to adjustment is performed, and the channel advertiser 257 transmits channel advertisement as periodic advertisement via the transmitter 22 (S110). If the adjustment trigger occurs and a synchronization target node is present (YES in S103 and YES in S104), the overlap schedule period detector 253 tries to detect the overlap schedule period (S105).

The trigger may be appropriately defined. For example, receipt of channel advertisement of another node may be regarded as a trigger. Alternatively, a fact that a scheduled time at which the overlap schedule period is resolved by adjustment is reached may be regarded as a trigger.

If the overlap schedule period is detected (YES in S106), an adjustment width calculation process is executed (S107) and the adjustment width is calculated. The flow of the adjustment width calculation process is described later.

If the overlap schedule period is not detected (NO in S106), the adjustment width determiner 255 adopts the adjustment width according to the synchronization target node (S108). Specifically, the adjustment width is determined such that the time slot width of the own node can be the same as the time slot width of the synchronization target node. For example, when the time slot width of the synchronization target node is the base time slot width, the adjustment width determiner 255 sets the adjustment width to "0". This is because if the time slot widths of the own node and the synchronization target node are not aligned with each other at a time point when the overlap schedule period is resolved, the resolved overlap schedule period occurs again. The process of S108 is performed at a time point when the overlap schedule period is scheduled to be resolved, thereby preventing the overlap schedule period from occurring again.

Here, if the overlap schedule period is resolved and is not detected accordingly, the time slot width of the own node and the time slot width of the synchronization target node are set to be the same. Alternatively, the execution condition (S106) of the process of S108 may be appropriately defined. For example, in cases where the overlap schedule period cannot completely be resolved, a fact that the overlap schedule period reaches a predetermined length may be adopted as the execution condition. Until the execution condition of the process of S108 such as a fact that the overlap schedule period is resolved or reaches a predetermined length is satisfied, the time slot is continuously extended or reduced, and the overlap schedule period is resolved or reduced.

Based on the adjustment width calculated by the process of S107 or S108, the storage 24 updates the stored channel hopping timing of the own node (S109). Accordingly, the reception channel can be changed at the updated channel hopping timing. The channel advertiser 257 then transmits channel advertisement at a scheduled time via the transmitter 22 (S110). The channel advertisement includes data about the updated channel hopping timing. Accordingly, the other nodes can recognize the change in channel hopping timing.

Figure 8:
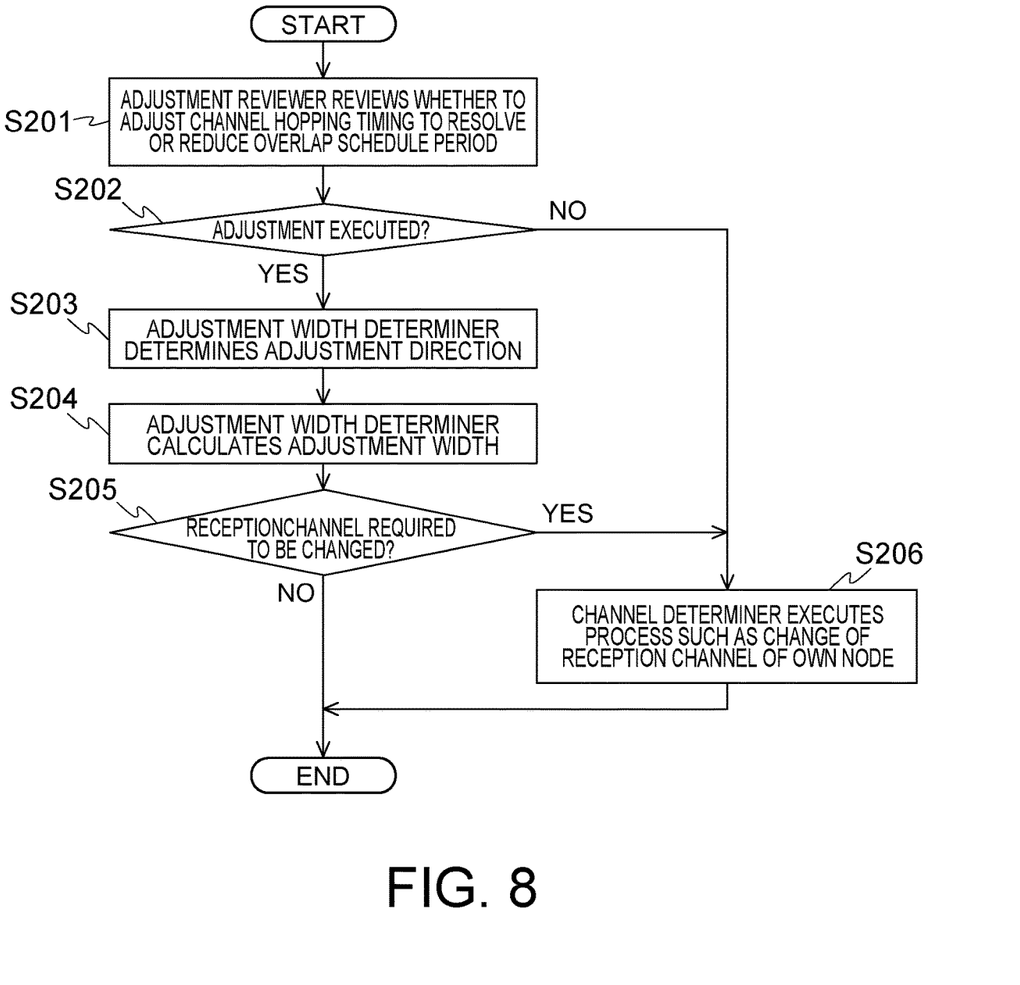
FIG. 8 is a schematic flowchart of an adjustment process.

Next, the flow of the adjustment width calculation process is described. FIG. 8 is a schematic flowchart of the adjustment width calculation process.

The adjustment reviewer 254 reviews whether to adjust the channel hopping timing in order to resolve or reduce the overlap schedule period (S201). If the adjustment is not executed (NO in S202), the channel determiner 252 executes the process such as change of the reception channel of the own node in order to resolve the overlap schedule period (S206). If the adjustment is executed (YES in S202), the adjustment width determiner determines whether to reduce or extend the time slot, that is, the adjustment direction (S203). The adjustment width determiner 255 calculates the adjustment width (S204).

If the reception channel is further required to be changed after the adjustment width is calculated (YES in S205), that is, if the overlap schedule period is reduced but cannot be resolved, similar to the case without executing the adjustment the channel determiner 252 executes a process, such as change of the reception channel of the own node (S206). As described above, this also supports a case where only adjustment of the channel hopping timing cannot completely resolve the overlap schedule period.

As described above, according to this embodiment, transition of the channel hopping timing from the scheduled time point, in other words, extension or reduction of the use schedule period of the reception channel of the wireless communication device, resolves or reduces the overlap schedule period. Accordingly, change in reception channel can be reduced. If the channel is changed, the change in channel is required to be advertised rapidly to the adjacent nodes. By setting the adjustment width within the transmission prohibition period, advertisements other than the periodic channel advertisement can be suppressed, and consumption of the wireless communication band can also be suppressed.

Note that this embodiment is applicable to various wireless communication standards that adopt the channel hopping scheme. The application is not limited to existing communication standards. In other words, this embodiment includes at least multiple wireless communication devices that wirelessly communicate while periodically switching the channel, and is applicable to any wireless communication system capable of extending or reducing the use schedule period of the reception channel of the wireless communication device; it is only required to resolve the overlap schedule period accordingly.

Each process in the embodiment described above may be achieved by a dedicated circuit, or achieved using software (program). In a case of using software (program), the embodiment described above can be achieved by, for example, using a general-purpose computer device as basic hardware to cause a processor, such as a central processing unit (CPU) mounted on a computer device, to execute the program.

Figure 9:
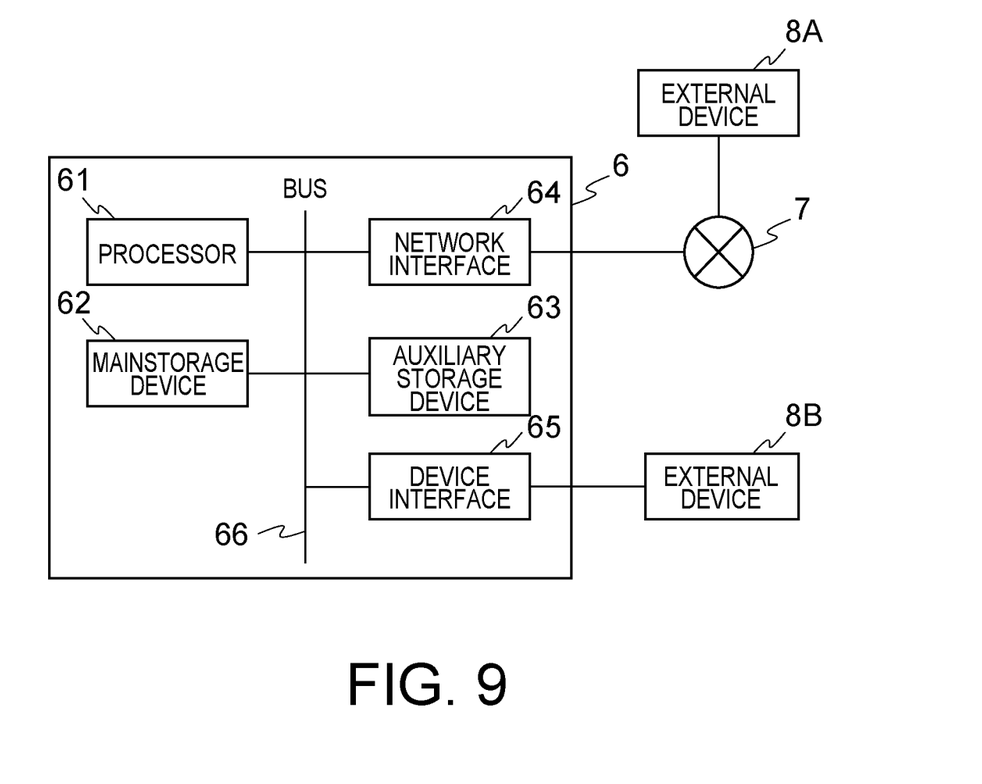
FIG. 9 is a block diagram illustrating an example of a hardware configuration according to one embodiment of the present invention.

FIG. 9 is a block diagram illustrating an example of a hardware configuration according to one embodiment of the present invention. The wireless communication devices 2 includes a processor 61, a main storage device 62, an auxiliary storage device 63, a network interface 64, and a device interface 65, which are connected to each other via a bus 66 and can be achieved as a computer device 6. Note that in FIG. 9, the computer device includes each one of the configuration elements. Pluralities of the same configuration elements may be provided. The wireless communication devices 2 can be connected directly or indirectly via a communication network 7 to external devices 8A and 8B.

Note that the configuration elements of the wireless communication device in this embodiment may be achieved by dedicated electronic circuits (i.e., hardware), such as ICs (Integrated Circuits), where processors, memories and the like are implemented. For example, the wireless communication device may include a reception circuit that achieves the receiver 21, a transmission circuit that achieves the transmitter 22, and a processing (control) circuit that achieves the channel hopping processor 25. The internal configuration of the channel hopping processor 25 may be achieved by dedicated circuit. Alternatively, the configuration elements may be achieved using software (program). In a case of using software (program), the embodiment described above can be achieved by, for example, using a general-purpose computer device as basic hardware to cause a processor, such as a central processing unit (CPU) mounted on a computer device, to execute the program.

Terms used in this embodiment should be widely construed. For example, a term "processor" may encompass a general-purpose processor, a central processing unit (CPU), a microprocessor, a digital signal processor (DSP), a controller, a microcontroller, and a state machine. According to situations, "processor" may indicate an application specific integrated circuit, a field programmable gate array (FPGA), a programmable logic device (PLD), etc. The "processor" may indicate a combination of processing devices, such as microprocessors, a combination of a DSP and a microprocessor, or one or more microprocessors that cooperate with a DSP core.

According to another example, a term "memory" may encompass any electronic component that can store electronic information. The "memory" may indicate a random access memory (RAM), a read-only memory (ROM), a programmable read only memory (PROM), an erasable programmable read-only memory (EPROM), an electrically erasable programmable read-only memory (EEPROM), a non-volatile random access memory (NVRAM), a flash memory, or a magnetic or optical data storage. That is, the storage 24 may be a memory or a storage. Such elements may be readable by the processor. In a case where the processor reads or writes information from or to the memory, or performs both of the reading and writing, it can be construed that the memory electrically communicates with the processor. The memory may be integrated into the processor. Also in this case, it can be construed that the memory electrically communicates with the processor.

Note that the present invention is not limited to the embodiment as it is. In an implementation stage, the configuration elements can be modified and specifically implemented in a range without departing from the gist. Various inventions can be formed by an appropriate combination of multiple configuration elements disclosed in the embodiment described above. For example, some configuration elements may be removed from among all the configuration elements indicated in the embodiment. Furthermore, configuration elements in different embodiments may be appropriately combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication system comprising at least a first wireless communication device and a second wireless communication device that periodically switch a reception channel and wirelessly communicate,
wherein the first wireless communication device:
detects an overlap schedule period during which the first wireless communication device and the second wireless communication device use the same reception channel, based on a use schedule period of the reception channel of the first wireless communication device and a use schedule period of the reception channel of the second wireless communication device;
determines to extend or reduce the use schedule period of the reception channel of the first wireless communication device, based on the detected overlap schedule period;
adjusts the use schedule period of the reception channel of the first wireless communication device so as to be extended or reduced according to the determination; and
switches the reception channel at an expiration time point of the adjusted use schedule period.

2. The wireless communication system according to claim 1,
wherein the first wireless communication device:
determines an adjustment width of the use schedule period of the reception channel of the first wireless communication device so as to be within a length of a transmission prohibition period to the first wireless communication device, this period being provided before and after an expiration time point of the use schedule period of the reception channel of the first wireless communication device; and
adjusts the use schedule period of the reception channel of the first wireless communication device so as to be extended or reduced by the adjustment width.

3. The wireless communication system according to claim 2,
wherein the first wireless communication device notifies the use schedule period of the reception channel of the first wireless communication device to the second wireless communication device through periodical transmission, and adjusts the use schedule period of the reception channel of the first wireless communication device, this period being included in the periodical transmission, and
the second wireless communication device determines a transmission channel to be used for the first wireless communication device, based on the use schedule period of the reception channel of the first wireless communication device obtained through the periodical transmission, and performs transmission to the first wireless communication device in the determined transmission channel in a period other than the transmission prohibition period to the first wireless communication device.

4. The wireless communication system according to claim 2,
wherein the use schedule period of the reception channel of the first wireless communication device is continuously extended or reduced until the overlap schedule period is resolved or reaches a predetermined length.

5. The wireless communication system according to claim 2,
wherein the first wireless communication device determines the transmission prohibition period, based on a clock drift of the first wireless communication device.

6. The wireless communication system according to claim 5,
wherein the first wireless communication device transmits a value larger than an actual clock drift of the first wireless communication device, as the clock drift of the first wireless communication device, to the second wireless communication device.

7. The wireless communication system according to claim 5,
wherein the first wireless communication device transmits, as the clock drift of the first wireless communication device, a maximum value transmittable as the clock drift of the first wireless communication device, to the second wireless communication device.

8. The wireless communication system according to claim 1,
wherein after the overlap schedule period is resolved, the first wireless communication device and the second wireless communication device have the same length of the use schedule period of the reception channel.

9. The wireless communication system according to claim 1,
wherein the first wireless communication device identifies the second wireless communication device from among the wireless communication devices belonging to the wireless communication system, based on routing information used for transferring a received packet.

10. The wireless communication system according to claim 1,
wherein the reception channel scheduled to be used is changed in the use schedule period that includes at least a part of the overlap schedule period.

11. The wireless communication system according to claim 1, further comprising a third wireless communication device,
wherein the first wireless communication device:
detects the overlap schedule period with the second wireless communication device, and the overlap schedule period with the third wireless communication device;
determines whether or not both the overlap schedule period with the second wireless communication device and the overlap schedule period with the third wireless communication device are resolvable by extending or reducing the use schedule period of the reception channel of the first wireless communication device;
selects one having a shorter time period required for resolution between the overlap schedule periods with the second wireless communication device and the third wireless communication device, when determining that both are unresolvable; and
adjusts the use schedule period of the reception channel of the first wireless communication device to extend or reduce this period so as to resolve the selected overlap schedule period.

12. The wireless communication system according to claim 1, further comprising a third wireless communication device, wherein the first wireless communication device:
- detects the overlap schedule period with the second wireless communication device, and the overlap schedule period with the third wireless communication device;
- determines whether or not both the overlap schedule period with the second wireless communication device and the overlap schedule period with the third wireless communication device are resolvable by extending or reducing the use schedule period of the reception channel of the first wireless communication device;
- selects any of the overlap schedule periods of the second wireless communication device and the third wireless communication device, based on priorities of the second wireless communication device and the third wireless communication device, when determining that both are unresolvable; and
- adjusts the use schedule period of the reception channel of the first wireless communication device to extend or reduce this period so as to resolve the selected overlap schedule period.

13. The wireless communication system according to claim 11, wherein the reception channel scheduled to be used is changed in the use schedule period that includes at least an unselected part of the overlap schedule period.

14. The wireless communication system according to claim 1, wherein the first wireless communication device determines whether or not the overlap schedule period is resolvable or not by extending or reducing the use schedule period of the reception channel of the first wireless communication device, and changes the reception channel scheduled to be used in the use schedule period that includes at least a part of the overlap schedule period, when determining that the overlap schedule period is unresolvable.

15. A wireless communication device usable as a first wireless communication device in a wireless communication system comprising at least the first wireless communication device and a second wireless communication device that periodically switch a reception channel and wirelessly communicate, the wireless communication device comprising:

- a detector configured to detect an overlap schedule period during which the first wireless communication device and the second wireless communication device use the same reception channel, based on a use schedule period of the reception channel of the first wireless communication device and a use schedule period of the reception channel of the second wireless communication device;
- a determiner configured to determine to extend or reduce the use schedule period of the reception channel of the first wireless communication device, based on the detected overlap schedule period;
- an adjuster configured to adjust the use schedule period of the reception channel of the first wireless communication device so as to be extended or reduced according to the determination; and
- a receiver configured to switch the reception channel at an expiration time point of the adjusted use schedule period.

16. A non-transitory storage medium storing a program executed by a wireless communication device usable as a first wireless communication device in a wireless communication system comprising at least the first wireless communication device and a second wireless communication device that periodically switch a reception channel and wirelessly communicate, the program causing the first wireless communication device to execute:

- detecting an overlap schedule period during which the first wireless communication device and the second wireless communication device use the same reception channel, based on a use schedule period of the reception channel of the first wireless communication device and a use schedule period of the reception channel of the second wireless communication device;
- determining to extend or reduce the use schedule period of the reception channel of the first wireless communication device, based on the detected overlap schedule period;
- adjusting the use schedule period of the reception channel of the first wireless communication device so as to be extended or reduced according to the determination; and
- switching the reception channel at an expiration time point of the adjusted use schedule period.

* * * * *